(No Model.)

6 Sheets—Sheet 1.

W. G. BUDLONG.
BOOT AND SHOE NAILING MACHINE.

No. 255,716.  Patented Mar. 28, 1882.

WITNESSES:
Henry J. Miller
Wm. L. Cook

INVENTOR:
William G. Budlong
by Joseph A. Miller & Co
Atty's

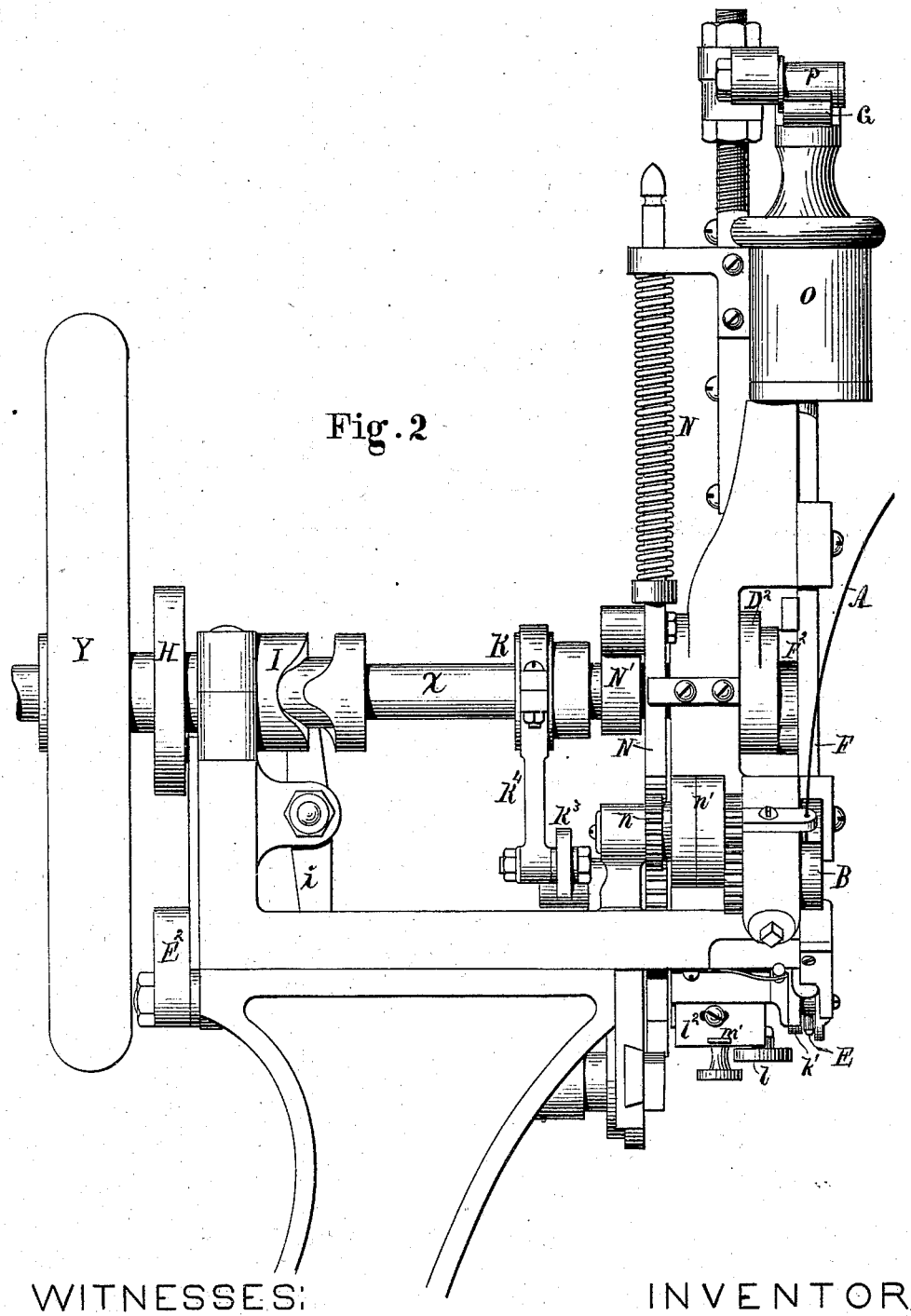

(No Model.) 6 Sheets—Sheet 3.
W. G. BUDLONG.
BOOT AND SHOE NAILING MACHINE.
No. 255,716. Patented Mar. 28, 1882.
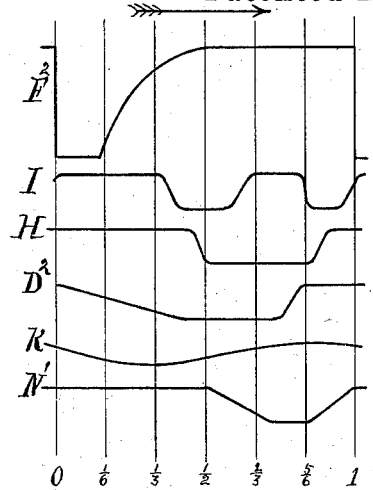
Fig. 4.
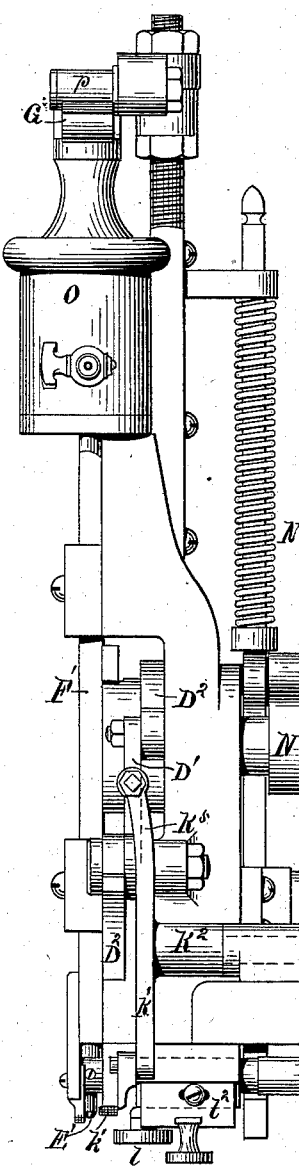
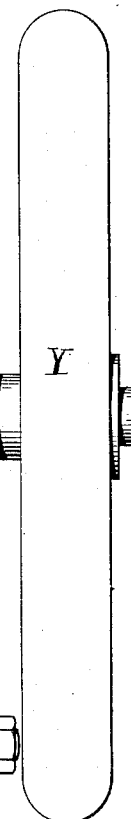
Fig. 3.
WITNESSES:
INVENTOR:
William G. Budlong.
by Joseph A. Miller & Co
Attys

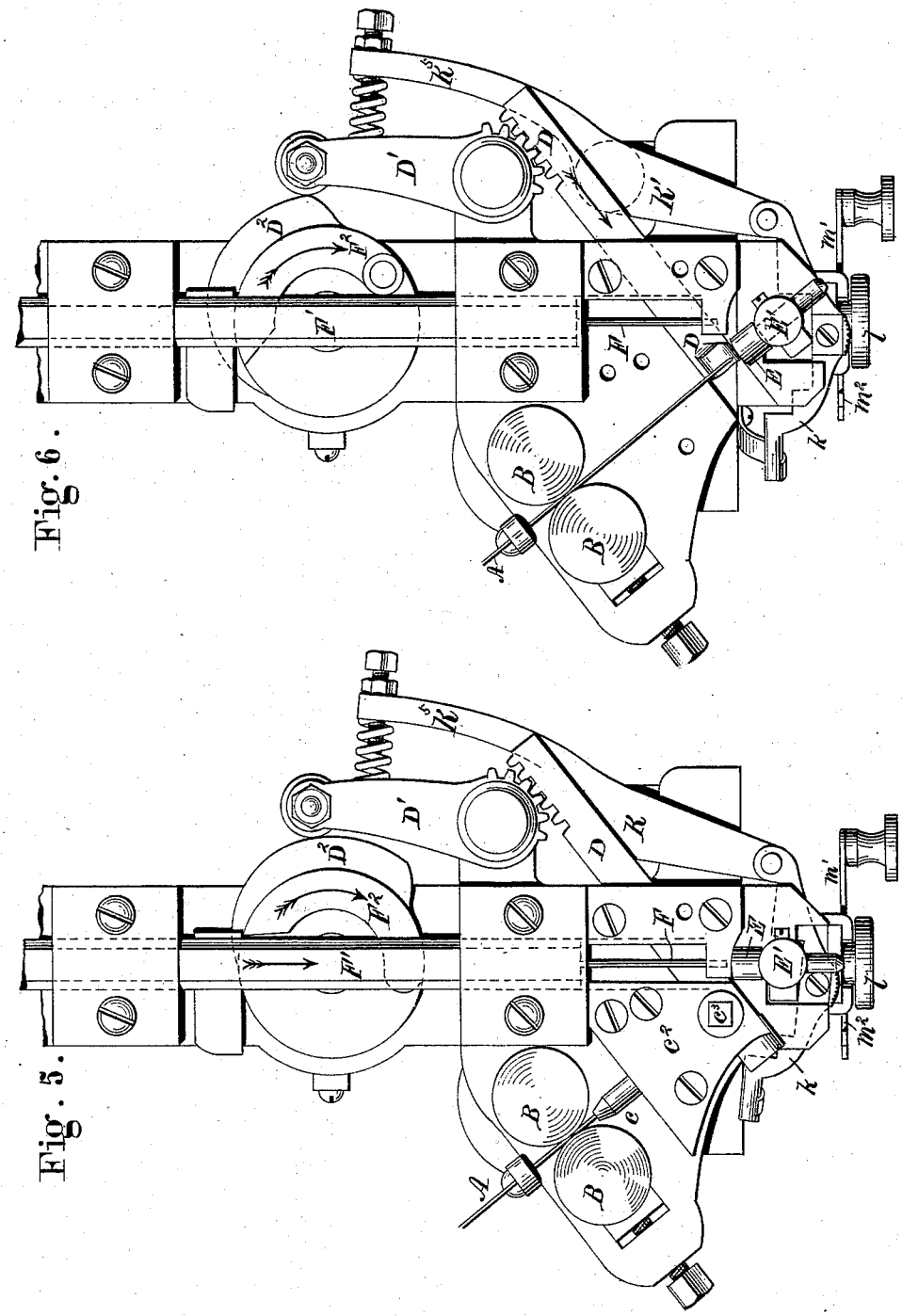

(No Model.) 6 Sheets—Sheet 5.

W. G. BUDLONG.
BOOT AND SHOE NAILING MACHINE.

No. 255,716. Patented Mar. 28, 1882.

WITNESSES:
Henry J. Miller
Wm. L. Cook

INVENTOR:
William G. Budlong.
by Joseph A. Miller & Co
Attys

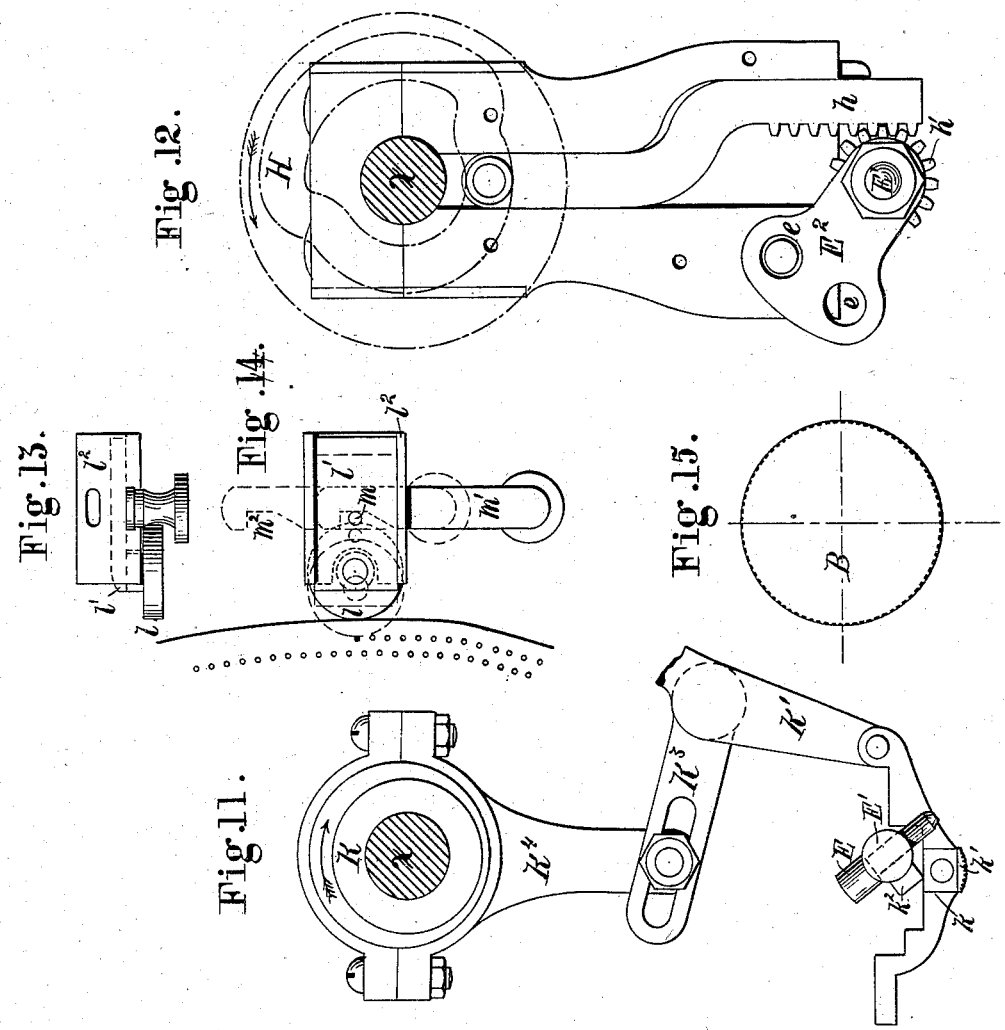

UNITED STATES PATENT OFFICE.

WILLIAM G. BUDLONG, OF PROVIDENCE, RHODE ISLAND, ASSIGNOR TO THE EUREKA NAILING MACHINE COMPANY, OF SAME PLACE.

BOOT AND SHOE NAILING MACHINE.

SPECIFICATION forming part of Letters Patent No. 255,716, dated March 28, 1882.

Application filed November 11, 1881. (No model.)

*To all whom it may concern:*

Be it known that I, WILLIAM G. BUDLONG, of the city and county of Providence, and State of Rhode Island, have invented a new and useful Improvement in Boot and Shoe Nailing Machines; and I hereby declare that the following is a full, clear, and exact description of the same, reference being had to the accompanying drawings, forming part of this specification.

This invention has reference to improvements in the class of boot and shoe nailing or pegging machines in which the wire is supplied to the machine, cut into nails, and driven into the boot or shoe, so as to secure the sole, automatically.

The invention consists in the peculiar and novel construction of the parts and their relations to each other by which the wire is fed, corrugated, cut and pointed, placed under the driver, and driven, as will be more fully set forth hereinafter.

The object of this invention is to simplify the construction of the machine, to make all the parts more accessible, to facilitate the adjustment of the length of the nail, protect the driver, and increase the speed of the machine.

Figure 1:
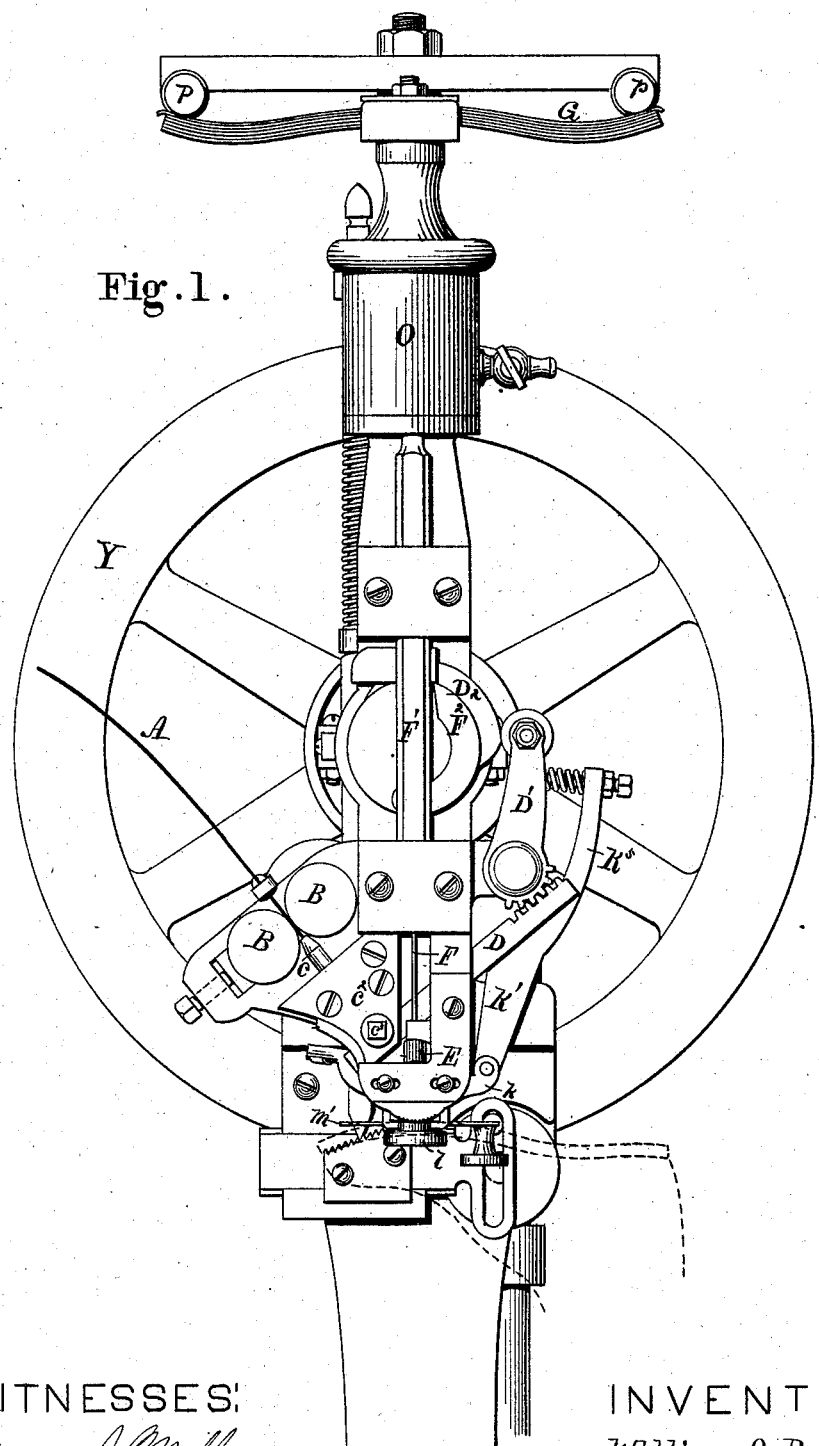
Figure 7:
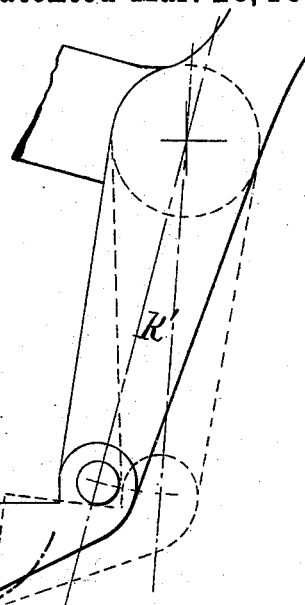
Figure 8:
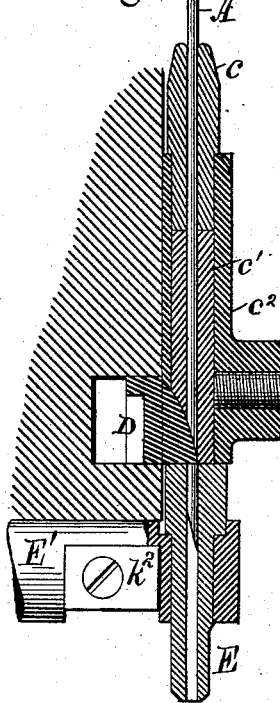
Figure 10:
Figure 9:
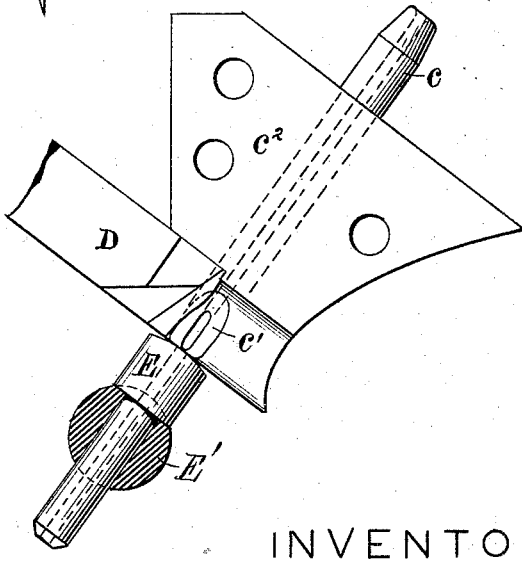

Figure 1 is a front elevation of my improved machine, showing a boot in broken lines. Fig. 2 is a side view of the machine, showing the machine mounted on its standard. Fig. 3 is a view partly in section of the side of the machine opposite to the side shown in Fig. 2. Fig. 4 is a diagram showing the form of the cams operating the various parts and the position of these parts at each sixth of one revolution of the driving-shaft. Fig. 5 is an end view of part of the machine, on an enlarged scale, showing the oscillating carrier-tube in line with the driver, and the cam by which the driver is raised in the position to release the same. Fig. 6 is an end view of the same parts of the machine as shown in Fig. 5, the plate securing the tube forming the guide for the wire, and the cutter-die being removed, the oscillating carrier-tube shown in the position to receive the nail which has been separated by the cutter from the wire. Fig. 7 is an enlarged view of the work-feeding device, shown in solid lines at the end of the forward motion, and extending below the guard, and in broken lines at the opposite end of its reciprocation above the guard, and therefore above the work. Fig. 8 is an enlarged sectional view of the guide-tube and die, as also the end of the cutter and a section of the oscillating nail-carrier, the separated nail being shown in the carrier. Fig. 9 is a rear view of the guide-tube, the cutter-die, and the plate by which they are secured, showing the end of the cutter and the oscillating carrier tube. Fig. 10 is a view of the nail made, cut, and driven by this machine. Fig. 11 is a skeleton view, showing the work-feeding device connected with and driven by an eccentric on the main driving-shaft. Fig. 12 is an enlarged view, showing the rack and pinion and its connection with a cam on the main shaft (said cam being shown in broken lines) by which the carrier-tube is oscillated, and also the arm provided with two holes by which the oscillating carrier is locked in the two positions occupied by the same. Fig. 13 is an end view, and Fig. 14 is a plan view, of the adjustable guide by which the distance from the edge of the sole to the nails is regulated. Fig. 15 is a full-size view of the feeding and corrugating rolls.

Similar letters of reference indicate corresponding parts in all the figures.

Boot and shoe nailing machines have to be operated by persons unskilled in mechanical refinements, and although they consist of complicated mechanical devices they have to be used as tools. In such machines it is important to reduce the working parts to the smallest number, secure the greatest possible strength, construct the machine so as to be readily accessible to repairs, and so that it can be run at the highest possible speed to produce the greatest possible amount of work.

In the drawings, A represents a wire, which is usually part of a coil of wire supported above the machine. This wire is the material from which the nail is formed and driven by the machine.

B B are two feed-rolls provided with toothed rims, as is shown in Fig. 15. An intermittent motion is imparted to these rolls B B to feed the wire, and they are held sufficiently close together to indent the wire and form ribs across the sides of the same, into which the leather enters when the nail is driven with a blow.

C is the guide-tube through which the wire is guided to the cutter. To protect the wire as much as possible the guide-tube C is made tapering at its upper end, so as to extend as near as possible to the bite of the rolls. The guide-tube C connects with the die or cutter tube C', and both are secured in the plate C² by means of the set-screw C³, as is shown in Fig. 8 in section. The nail is separated from the wire by the cutter D, and at the same cut the next nail is pointed, as is also clearly shown in Fig. 8. The end of the cutter D is beveled, so as to make a slanting cut, entering at the upper edge first and completing the cut at the lower edge, as is shown in Fig. 9. The plate C² is secured by means of three screws to the front of the machine, and can be readily removed for the purpose of grinding or adjusting the die-tube C' and to give access to the cutter D.

The cutter D consists of a flat bar provided at its upper end with a toothed rack and at its lower end with a protuberance forming the cutter proper. By this construction I am enabled to pass the cutter-bar behind the driver, as is clearly shown in Fig. 6, and allow the protuberance or cutter proper to reciprocate sufficiently to cut the wire. The wire and the driver being on the same plane, the carrier E, secured to the end of the shaft E', receives the separate nail and carries the same under the driver F, formed of a stiff wire secured to the bar F', which is raised against the spring G by the cam F².

The carrier E is operated by the partial rotation of the shaft E', which extends to the rear of the machine, as is shown in Fig. 3. The oscillating motion is imparted to the shaft by means of the rack $h$ and pinion $h'$, operated by the cam H, as is shown in Fig. 12. The shaft E' is locked in the position occupied when the carrier E is receiving the nail, and also locked when the carrier is under the driver by means of the arm E², firmly secured to the shaft E', and provided with the holes $e\ e$, into which the locking-bolt $i$ enters at the time when either one of these holes is opposite the same. The bolt $i$ is operated through the lever $i'$ by means of the cam I, secured to the main driving-shaft X. After each nail is driven into the boot or shoe sole the same is moved forward the desired distance by the work-feeding arm $k$, provided with a roughened projection, $k'$, as is shown in solid lines in Fig. 7, and this arm $k$ is held down onto the work by means of the stop $k^2$, secured to the shaft E', which shaft is at that time firmly locked, as the carrier is at this time in position to receive the newly-separated nail.

The arm $k$ is hinged to the bell-crank lever K', supported on the rock-shaft K². The arm K³ of the bell-crank lever K' is slotted, so that it can be adjustably connected with the eccentric-arm K⁴, which is reciprocated by the eccentric K, secured to the main driving-shaft X, and thus as the throw of the eccentric is fixed by securing the connection of the eccentric-arm K⁴ farther from or nearer to the rock-shaft of the bell-crank lever the motion of the arm $k$ will be increased or lessened and the distance between the nails regulated.

The bell-crank lever is provided with an upward-extending arm, K⁵, provided with a set-screw and a spiral spring, forming a yielding bearing by which the arm D' is held against the cam D², by which the cutter-bar is operated.

The arm K⁵ of the bell-crank lever may be dispensed with, and the arm D' may be held against the cam D² by other means.

At the time when the nail is driven the shaft E', having the carrier at its forward end, has been rotated and the stop $k^2$ is raised off from the arm $k$. The eccentric K at this moment depresses the arm K³ of the bell-crank lever, and the arm $k$ is drawn back without bearing on the work, as is shown in Fig. 7 in broken lines.

To regulate the distance of the nails from the edge of the sole, I provide the lower part of the machine with a disk revolving on a pin secured to a slide. Figs. 13 and 14 represent this device. $l$ is the revolving disk, against which the edge of the sole is held. The disk revolves on a stud secured to the plate $l'$, which slides in a groove in the plate $l^2$. The plate $l'$ is provided with the pin $m$, passing through the plate $l^2$, and at right angles to the motion of the plate $l'$ is the bolt $m'$, provided with a knob or handle, so that the same can be drawn in or out. The pin $m$ on the plate $l'$ bears against the bolt $m'$, and thus forms a stop to the sliding plate $l'$ and the disk $l$, holding the same so as to guide the work held against the rotating disk $l$.

The bolt $m'$ is provided with a recess, $m^2$, as is shown in broken lines, one end of which forms an incline. When, now, the bolt is drawn out, as is shown in Fig. 14 in solid lines, the pin $m$ enters the recess $m^2$, and the guide, roller, or disk $l$ can move inward a distance equal to the depth of the recess $m^2$, as is shown in Fig. 14, and as the edge of the work will move in against the disk $l$ the nails will be driven farther from the edge. In driving two rows of nails, as shown in Fig. 14, either the inner or outer row may be driven first, and by either pushing the bolt $m'$ in or drawing the same out the other row may be driven without stopping the machine or losing time.

The operation of my improved boot and shoe nailing machine is as follows: The machine being properly set up and connected to be driven from some prime motor, and the work being ready, the end of a coil of wire of the proper size is inserted between the corrugating feed-rolls, which have an intermittent rotary motion imparted to them by the spring-pressed rack-bar N, raised by a cam, N', screwed to the driving shaft X, engages with and rotates the pinion $n$ in both directions. As it ascends and descends, this motion is conveyed by the clutch $n'$ to a pair of gears secured to the feed-rolls B B in such a manner that only as the spring-pressed rack-bar N is raised by the cam N′ is the rotary motion imparted to the feed-rolls, the clutch allowing the pinion $n$ to be rotated by the reaction of the coiled spring by which the rack-bar N is made to follow the cam N′. The now corrugated wire passes through the tube C to the cutter D, where it is pointed and separated, and enters the carrier E as a nail ready to be driven into the work. The carrier makes a short oscillation and brings the nail under the driver, which, being released, drives the nail with a blow exerted by the spring G acting on the driver-bar, such blow being controlled by an air-cushion formed in the dash-pot O in the same manner as is fully described in Patent No. 172,911.

To allow the spring to exert its full force and prevent friction, I place the two rolls $p\ p$ on the standard and allow the spring to bear against them, as is shown in Figs. 1, 2, and 3.

To equalize the power exerted at any particular point of the revolution of the main shaft X, I place the fly-wheel Y on the same.

It will be evident from Fig. 4 that at each revolution of the main shaft X the various devices perform their functions, and that at each revolution a nail is formed, driven, and the work moved forward to receive the next nail.

In boot and shoe nailing machines as heretofore constructed the operations of the various devices were also performed at each revolution of the main shaft X; but such machines were not as simple and effective in their operations, and could not be worked at so high a speed.

I do not claim operating a boot and shoe nailing machine by means of cams, broadly, but confine my claims to the improvement herein set forth and claimed.

Having thus described my invention, I claim as new and desire to secure by Letters Patent—

1. The combination, with the intermittently-rotating rolls B B, constructed to corrugate the wire, of the guide-tube C, provided with a tapering end extending between the rolls and arranged to conduct the wire to the cutter, as described.

2. In a boot and shoe nailing machine, the detachable plate $C^2$, secured to the frame and constructed to support the tube C and die-tube C′, substantially as before set forth.

3. The combination, with the cutter D and the die-tube C′, of the removable plate $C^2$, provided with locking-screw $C^3$ and channeled at its lower end to allow the cutter to reciprocate, as described.

4. The combination, substantially as before set forth, of the reciprocating driver, the oscillating carrier, the reciprocating cutter-bar provided with a triangular cutter, and the fixed die-tube for supporting the wire in cutting pointed nails therefrom.

5. The combination, with the driver and the carrier E of a boot and shoe nailing machine, of the work-feeding device consisting of the arm $k$, provided with a roughened face held to the work by the stop $k^2$, and hinged to a bell-crank lever operated by an eccentric on the main driving-shaft, as described.

6. The combination, in a boot and shoe nailing machine, with the driver and the nail-forming devices, of the carrier E, secured to the end of the shaft E′, and means for partially rotating the shaft and locking the same, as described.

7. The combination, with the cam H, of the rack $h$ and pinion $h'$, constructed to impart oscillating motion to the carrier E, as described.

8. The combination, with the device for feeding and indenting the wire, of the cutter D, provided with a rack, the arm D′, provided with a pinion, and the cam $D^2$, constructed to separate the nail from the wire, as described.

9. In a boot and shoe nailing machine, the sole edge guide consisting of the disk $l$, slide $l'$, and the recessed bolt $m'$, constructed to regulate the distance of the nails from the edge of the sole, as described.

WILLIAM G. BUDLONG.

Witnesses:
J. A. MILLER, Jr.,
HENRY J. MILLER.